(12) United States Patent
Ohishi et al.

(10) Patent No.: US 6,895,783 B2
(45) Date of Patent: May 24, 2005

(54) METHOD OF PRODUCING OPTICAL FIBER PREFORM

(75) Inventors: Toshihiro Ohishi, Kanagawa (JP); Yuichi Ohga, Kanagawa (JP); Motonori Nakamura, Kanagawa (JP)

(73) Assignee: Sumitomo Electric Industries, Ltd., Osaka (JP)

( * ) Notice: Subject to any disclaimer, the term of this patent is extended or adjusted under 35 U.S.C. 154(b) by 378 days.

(21) Appl. No.: 09/956,867

(22) Filed: Sep. 21, 2001

(65) Prior Publication Data

US 2002/0081377 A1 Jun. 27, 2002

(30) Foreign Application Priority Data

Sep. 21, 2000 (JP) .................................. P 2000-287071
Aug. 3, 2001 (JP) .................................. P 2001-236247

(51) Int. Cl.$^7$ ............................................ C03B 37/018
(52) U.S. Cl. ........................................ 65/421; 65/427
(58) Field of Search .......................... 65/413, 414, 416, 65/421, 427, 377; 427/132.2, 193, 166, 167

(56) References Cited

U.S. PATENT DOCUMENTS 4,564,378 A * 1/1986 Kuisl ........................... 65/422
5,116,400 A    5/1992 Abbott et al.
5,211,732 A *  5/1993 Abbott et al. .................. 65/421
5,958,102 A    9/1999 Shimada et al.
6,047,564 A    4/2000 Schaper et al.
6,546,759 B1 * 4/2003 Tobisaka et al. ............... 65/531
6,553,790 B1 * 4/2003 Fleming et al. ............... 65/382

FOREIGN PATENT DOCUMENTS

| EP | 0 476 218 A1 | 3/1992 |
| EP | 0 476 218 B1 | 10/1996 |
| JP | 3-228845 | 10/1991 |
| JP | 3-279234 | 12/1991 |
| JP | 3-228845 A | 1/1992 |
| JP | 7-25637 | 1/1995 |
| JP | 2612949 | 2/1997 |
| JP | 10-158025 | 6/1998 |

* cited by examiner

*Primary Examiner*—Steven P. Griffin
*Assistant Examiner*—Carlos Lopez
(74) *Attorney, Agent, or Firm*—McDermott Will & Emery LLP

(57) ABSTRACT

A plurality of glass particles synthesizing burners are arranged at a predetermined burner interval opposite to a rotating starting rod. The starting rod and the glass particles synthesizing burners are relatively parallely reciprocally moved, and the soot deposition is conducted. A reciprocating speed v(mm/minute), axis rotating speed r (rpm), and burner interval L (mm) are set so that a value A expressed by the expression $A = (r/v) \times L$ is in a range $40 \geq A \geq 8$.

11 Claims, 4 Drawing Sheets

METHOD OF PRODUCING OPTICAL FIBER PREFORM

BACKGROUND OF THE INVENTION

1. Field of the Invention

The present intention relates to a method of producing an optical fiber preform by an OVD (Outside Vapor Deposition) method. Specifically, the present invention relates to the method of producing the optical fiber preform including a soot deposition process by which the outer diameter fluctuation of the optical fiber perform is slight in a longitudinal direction, and the deposition efficiency of the soot (glass particles) is high, and it is possible to adjust a ratio of a diameter of a starting rod portion of the optical fiber perform to a diameter of the optical fiber preform.

2. Description of the Related Art

As a method for producing a large size optical fiber preform at the high speed, there is a method that a plurality of glass particles synthesizing burners are arranged at a predetermined interval opposite to a starting rod, and glass particles (soot) are deposited on the starting rod surface in layer form (multi-layers soot deposition) while the rotating starting rod and row of the burners are relatively reciprocally moved. The relative movement of burners and the starting rod from one end to the other end in the reciprocal movement is called "traverse". In such the method for depositing the glass particles (soot deposition method), it is important that the outer diameter fluctuation in the longitudinal direction of the glass particle deposit (soot body) is the slightest, and many kinds of methods for that are proposed.

In the multi-layers soot deposition using the plurality of burners, one of factors of the outer diameter fluctuation of the soot body is that a reciprocating speed of the burners and/or the starting rod (that is, relative reciprocating speed of the burners and the starting rod) becomes zero at a turning back position of the traverse (hereinafter, called turning back portion). This causes that an actual soot deposition time at the turning back portion is longer than that on another portion, or the degree of touching of the burner flame onto the soot body is different. Accordingly, when the reciprocate is conducted at a predetermined period, the deposition amount of the soot is varied at the turning back portion, resulting in the outer diameter fluctuation. As the method for resolving this problem, there is a method that the turning back position of the traverse is moved in a predetermined direction for each turn, and after it is moved to a predetermined position, it is moved to a reversal direction and returned to the initial position (Japanese Patent Unexamined Publication No. Hei. 3-228845). Herein, the number of turns for the turning back portion to return to the initial position is called averaged number of turns. With this, the fluctuation at the turning back portion in which actually soot deposition time is extended, or the fluctuation of the degree of toughing of the burner flame onto the soot body, is distributed to the whole soot body, and the actual soot deposition time or atmosphere of the whole soot body is made averagely coincident with each other. Therefore, the deposition amount of the soot is uniform in the longitudinal direction, and the outer diameter fluctuation is reduced.

Further, as a method to reduce the outer diameter fluctuation, based on the method described in the above-mentioned Japanese Patent Unexamined Publication No. Hei. 3-228845, there is a method that the fluctuation of the outer diameter of the whole soot body is measured, and the additional soot deposition is conducted to a portion, in which the soot deposition amount is small, by an auxiliary soot deposition burner so as to reduce the fluctuation of the outer diameter (Japanese Patent Unexamined Publication No. Hei. 10-158025). The fluctuation of the outer diameter of the whole soot body is measured by a CCD camera which can monitor the whole soot body and a central information processor. The auxiliary soot deposition burner can independently traverse the whole soot body.

In a process for depositing the glass particles which becomes a cladding on the starting rod including a core (hereinafter, also described as soot deposition or overclad deposition), the important factor in the characteristic of the optical fiber is that, after the overclad deposition, a ratio of the diameter of the starting rod portion to the diameter of the consolidated and vitrified body (hereinafter, called J ratio) can be accurately controlled to a target J ratio, and there is no fluctuation of the J ratio in the longitudinal direction (Incidentally, a consolidated and vitrified body is synonymous with an optical fiber preform). The fluctuation of the outer diameter in the longitudinal direction, which has been studied in the prior art, means the J ratio fluctuation in the longitudinal direction. In the prior art, it has not been considered that the J ratio is accurately controlled so that it is equal to the target J ratio. In the view of the characteristic of the optical fiber, it is important that the J ratio is accurately controlled to the target J ratio because the characteristic of the optical fiber is changed when the J ratio is changed. Strictly speaking, a diameter of a starting rod differs each other, therefore, it is difficult to attain the target characteristic of the optical fiber when it can not be accurately controlled to the target J ratio. Therefore, it is important in the overclad deposition that minute J ratio adjustment or the deposition amount adjustment to the soot diameter direction can be conducted.

In the case of the method of the above-mentioned Japanese Patent Unexamined Publication No. Hei. 3-228845, when the soot deposition is stopped on the way of the averaged number of turns, the width of J ratio fluctuation is increased. Therefore, it is desirable that the soot deposition is stopped at an integer times of the averaged number of turns. However, when the soot deposition is stopped at the integer times of averaged number of turns, the deposition amount of the soot deposited during one averaged number of turn is quite larger, thereby the minute J ratio adjustment becomes difficult. In the method of the above-mentioned Japanese Patent Unexamined Publication No Hei 10-158025, before the soot outer diameter becomes the target soot outer diameter, the soot deposition by a plurality of main burners is stopped, and then the soot deposition to portions at which the deposition amount is small is conducted by only the auxiliary soot deposition burner so that the target soot outer diameter is adjusted while the outer diameter fluctuation is reduced. However, in this method, the efficiency of the soot deposition is reduced (the necessary time for soot deposition is prolonged). Further, in the method of the Japanese Patent Unexamined Publication No. Hei. 10-158025, it is necessary that a movement mechanism for traversing the auxiliary soot deposition burner over the whole range of the soot body is disposed in a vessel, or the movement mechanism is arranged outside the vessel. When the movement mechanism is arranged outside the vessel, it is necessary to provide a hole for whole range traversing to insert the burner into the vessel.

When the movement mechanism is inserted into the vessel, the impurities are mixed in the soot, and they cause voids at the time of consolidating and vitrifying the soot body into a transparent. When a hole is provided in the vessel, a capability that voids are generated by the impurities mixing from the outside is increased. This is the reason why air inside the vessel is kept in the negative pressure so as not to go out to the outside, because the inside of the vessel is in the acid atmosphere, and thereby the outside air enters into the vessel and the dust of outside the vessel accompanied with it enters into the vessel.

SUMMARY OF THE INVENTION

The present invention is attained in view of these problems Accordingly, an object of the present invention is to provide a method of producing an optical fiber preform including a soot deposition process by which the fluctuation of the J ratio of the optical fiber preform is slight in the longitudinal direction, the minute J ratio adjustment is possible, and the generation of the void by the mixing of the impurities into the soot is reduced. Further, an another object of the present invention is to provide a method of producing an optical fiber preform including a soot deposition process in which the CCD camera or auxiliary soot deposition burner and the movement mechanism accompanied with it, as in the above-mentioned Japanese Patent Unexamined Publication No. Hei. 10-158025, are not necessary and also the cost in the equipment is low.

In the prior art, there is not the method for adjusting the J ratio to obtain an optical fiber preform having a target J ratio. However, the present inventors made various considerations in view of a fact that, in order to produce a high quality optical fiber preform, it is important that the J ratio fluctuation in the longitudinal direction is small, and the accurate J ratio adjustment can be conducted (to obtain the soot body of J ratio close to the target J ratio as possible). In order to conduct the accurate J ratio adjustment, it was considered that, initially, the reciprocating speed is increased, and the soot amount deposited hy one traverse is decreased (the thickness of one layer is decreased). However, in these considerations, by remarking only one factor, the new problem is further generated. Therefore, it was found that it is necessary that the indispensable factors are selected and they are controlled together.

That is, in the case where the soot deposition is conducted by the method of the present invention, the soot is basically deposited spirally. Therefore, when the reciprocatin speed is increased, the spiral pitch is increased, and the unevenness is easily generated (the top (convex) and bottom (concave) are conspicuous) on the surface of the soot. In order to prevent it, it is necessary that the rotating speed of the rod is increased. However, there is a limit for increasing the rotating speed, owing to the strength of rod or the deposited layers. Each kind of factors is related to each other, therefore, it was found that it is necessary that correlations thereof are well controlled.

The present invention is based on the result of such the general considerations. The above-mentioned object of the present invention can be achieved by the following method (1)–(8).

(1) A method of producing an optical fiber preform in which plurality of glass particles synthesizing burners are arranged with an burner interval of 0.85 $L_0$–1.15 $L_0$ ($L_0$ is a setting value of the burner interval) opposite to a rotating starting rod; the starting rod and the glass particles synthesizing burners are parallely and relatively reciprocally moved; a turning back position of the reciprocal movement is moved in a predetermined direction by a predetermined distance for each movement; and when the turning back position is moved by 0.85 $L_0$–1.15 $L_0$, the turning back position is moved to a reversal direction. By repeating this movement, the glass particles synthesized by the burner is successively deposited on the surface of the starting rod. After that, the obtained glass particle deposit is consolidated and vitrified. In the production method of the optical fiber perform, when a reciprocating speed (relative reciprocating speed of the burners and the starting rod) v (mm/minute), an axis rotating speed of the starting rod r (rpm), and a burner interval setting value $L_0$ (mm) are set so that a value A expressed by an expression A=(r/v)×$L_0$ is in the range $40 \geq A \geq 8$.

(2) A method of producing an optical fiber preform in which a plurality of glass particles synthesizing burners are arranged with a predetermined burner interval opposite to a rotating starting rod; the starting rod and the glass particles synthesizing burner are parallely and relatively reciprocally moved; a turning back position of the reciprocal movement is moved in a predetermined direction by each one integer-th of the burner interval; and when the turning back position is moved by the burner interval, the turning back position is moved to a reversal direction. By successively repeating this operation, the glass particles synthesized by the burner are successively deposited on the surface of the starting rod. After that, the obtained glass particle deposit is consolidated and vitrified In the production method of the optical fiber preform, when a reciprocating speed (relative reciprocating speed of the burners and the starting rod) v(mm/minute), an axis rotating speed of the starting rod r (rpm), and a burner interval L (mm) are set so that a value A expressed by the expression A=(r/v)×L is in a range of $40 \geq A \geq 8$.

(3) A method of producing an optical fiber preform according to (1) or (2), wherein the relationship between the reciprocating speed v (mm/minute) and the axis rotating speed r is controlled so that a center line of the soot (glass particles) spirally deposited at one traverse is not overlapped with a center line of the soot deposited at the preceding traverse.

(4) A method of producing an optical fiber preform according to any one of (1)–(3), wherein the reciprocating speed v (mm/minute) is in the range of $500 \leq v \leq 3000$.

(5) A method of producing an optical fiber preform according to any one of (1)–(4), wherein the burner interval setting value $L_0$ (mm), or the burner interval L (mm) is in the range of 150 mm $\leq L_0 \leq$ 350 mm, or 150 mm $\leq L \leq$ 350 mm.

(6) A method of producing an optical fiber preform according to any one of (1)–(5), wherein the axis rotating speed r (rpm) is in the range of $27 \geq 10 \times Log[(M \times r)/b]$, wherein the soot weight (weight of glass particles) of the target J ratio (target ratio of a diameter of the starting rod portion of the optical fiber preform to a diameter of the optical fiber preform) is M (kg), and the outer diameter of the starting rod is b (mm).

(7) A method of producing an optical fiber preform according to any one of (1)–(6), wherein the glass particles deposition is stopped at the time when the number of turns reaches an integer times of the averaged number of turns at which the glass particles weight becomes closest for a weight of a target J ratio. The averaged number of turns is the number of turns for turning back portion to return to the initial position.

(8) A method of producing an optical fiber preform according to any one of (1)–(6), wherein the reciprocating speed v (mm/minute) after the B turns is adjusted so that the soot weight deposited during one traverse is (M−N)/C (kg), and when the number of traverse turns is B+C, the soot deposition is stopped, wherein the soot weight of the target J ratio is M (kg), and an integer times of an averaged number of turns at which the soot weight is not larger than M (kg) and closest to M (kg) is B turns, the soot weight at B turns is N (kg), and the averaged number of turns is C (times).

The production method of the optical fiber preform of the present invention is based on the method in which a plurality of glass particles synthesizing burners are arranged with a predetermined burner interval opposite to a rotating starting rod, the starting rod and the glass particles synthesizing burners are parallely and relatively reciprocally moved, a turning back position of the reciprocal movement is moved in a predetermined direction by each predetermined distance, and when the turning back position is moved by a predetermined interval, the turning back position is moved to the reversal direction. By successively repeating this operation, the glass particles synthesized by the burners are successively deposited on the surface of the starting rod, and then the obtained glass particle deposit is consolidated and vitrified.

In the method of the present invention, the burner interval may be uniform, and the movement distance of the turning back position for each reciprocal movement is one integer-th of the burner interval. When the turning back position is moved by the burner interval, the turning back position is moved to the reversal direction Tolerance for the burner interval is the range of ±15% from the setting value, (including the case where the interval is not uniform) Tolerance for the movement distance of the turning back position is the range from one integer-th to ±15 % of the setting value of the burner interval. Tolerance for the movement distance of the turning back position until the turning back position is moved to the reversal direction, is the range of ±10% from the setting value of the burner interval.

DETAILED DESCRIPTION OF THE PREFERRED EMBODIMENT

Figure 1:
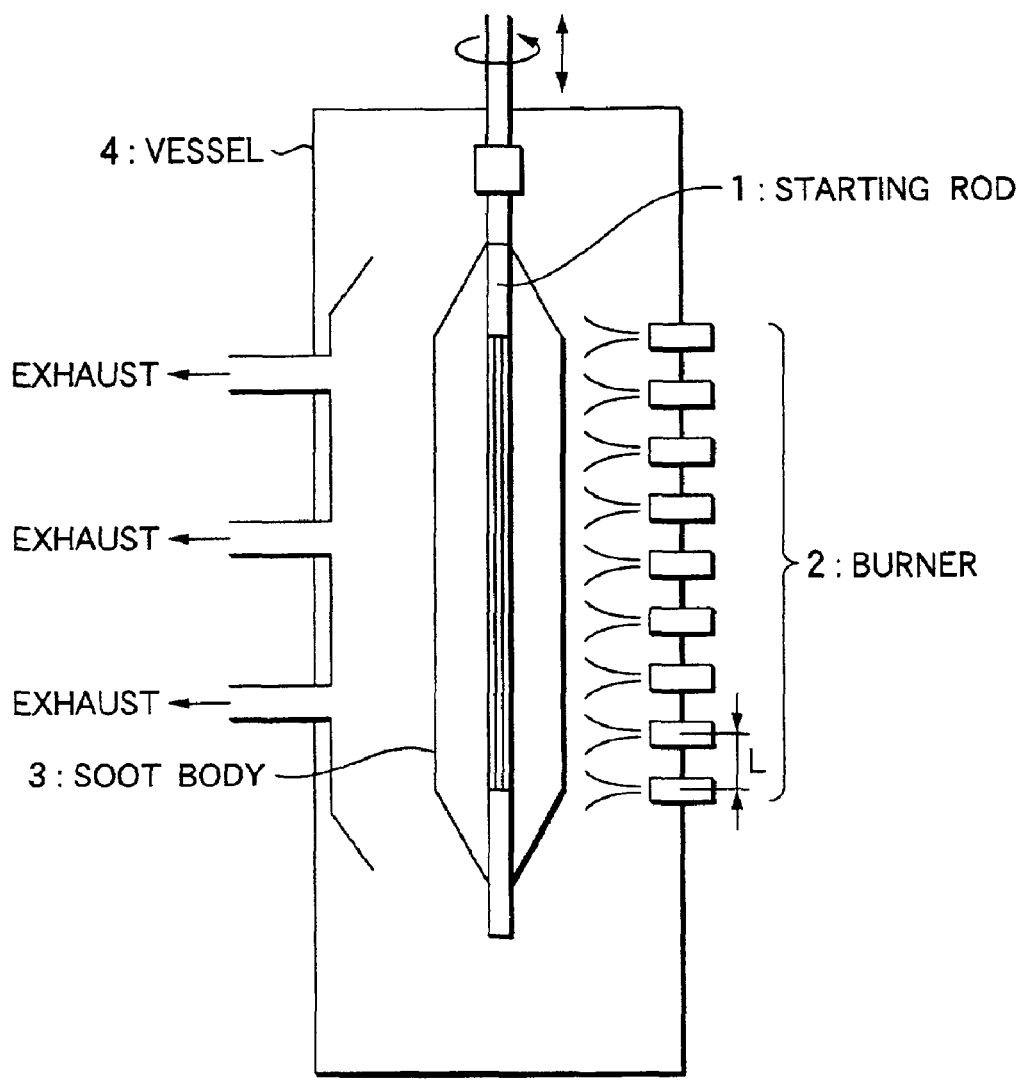
FIG. 1 is an illustration showing the conception of the apparatus structure in a soot deposition process according to the present invention.

Referring to the drawings, the method of the present invention will be described below mainly based on the basic structure. The soot deposition process in the production method of the optical fiber preform of the present invention is based on a multi-layer soot deposition-method. As shown in FIG. 1, a starting rod 1 and a plurality of glass particles synthesizing burners 2 are arranged in a vessel 4 in such a manner that the burners 2 are arranged with a predetermined burner interval (L) opposite to the starting rod 1. The starting rod 1 and the row of the burner 2 is relatively reciprocally moved (in the drawing, an example in which the starting rod 1 is reciprocally moved up and down, is shown). The starting rod 1 is also rotating. A turning back position of the reciprocal movement is moved in a predetermined direction by each one integral-th of the burner interval. When the turning back position is moved by the burner interval, the turning back position is moved in a reversal direction. By successively repeating this operation, the glass particles (soot) are deposited on the surface of the starting rod 1 in layer form, and the glass particle deposit (soot body) 3 is produced.

Figure 2:
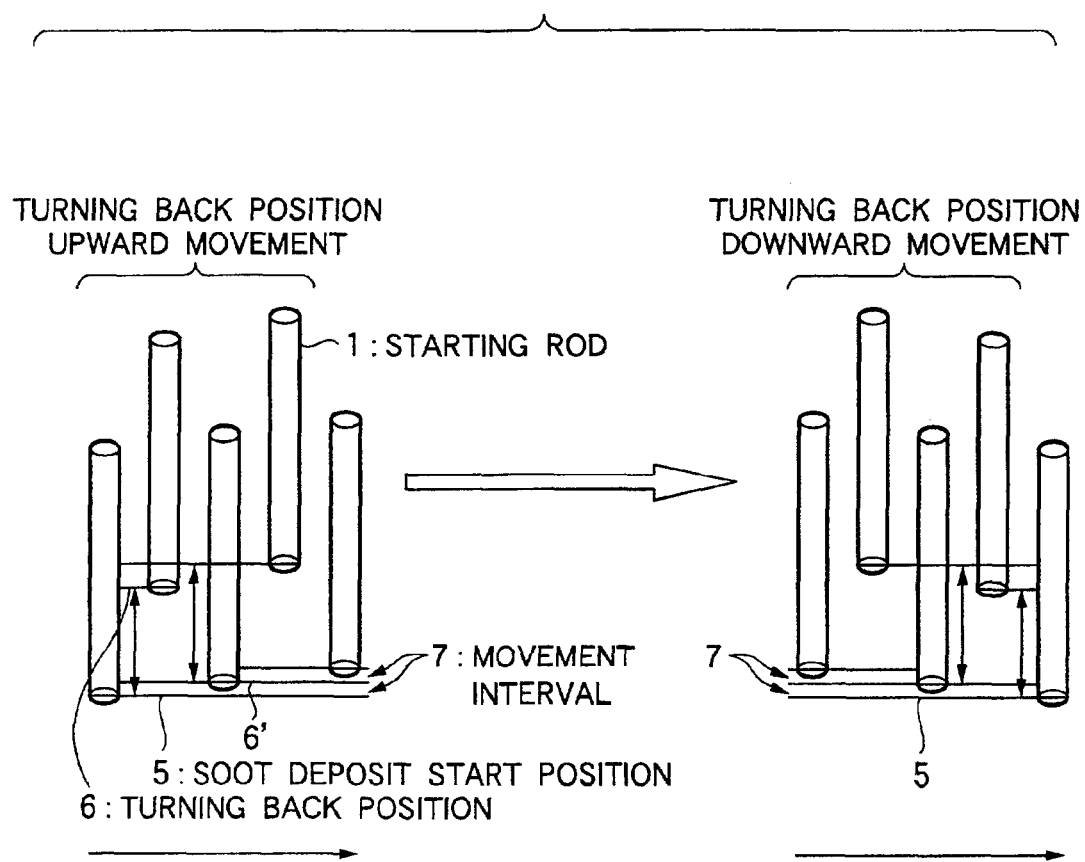
FIG. 2 is an illustration typically showing a traverse pattern in the soot deposition process according to the present invention.

In FIG. 2, the movement condition of the turning back position of the traverse is typically shown. In FIG. 2, a position of starting rod is shown left to right according to passage of time. The starting rod 1 moves from a soot deposition start position 5 upward, and turns back at a turning back position 6. The movement from the position 5 to position 6 is called a traverse. Then, as shown in the left side in the drawing, the rod 1 traverses downward, and turn back at a turn back position 6' which is positioned upward from the soot deposition start position 5 by a movement interval 7 corresponding to one integer-th of the burner interval. That is, for each reciprocal movement, the turning back position of the reciprocal movement is moved to upward by each movement interval 7 corresponding to one integer-th of the burner interval. When the turning back position is moved by the burner interval, as shown in the right side in the drawing, the turning back position is moved downward by each movement interval 7 corresponding to one integer-th of the burner interval. Herein, the movement of the burners to return to the soot deposition start position 5 is made one unit. This operation is repeated up to a predetermined J ratio. The number of turns of the one unit is the averaged number of turns.

Figure 3:
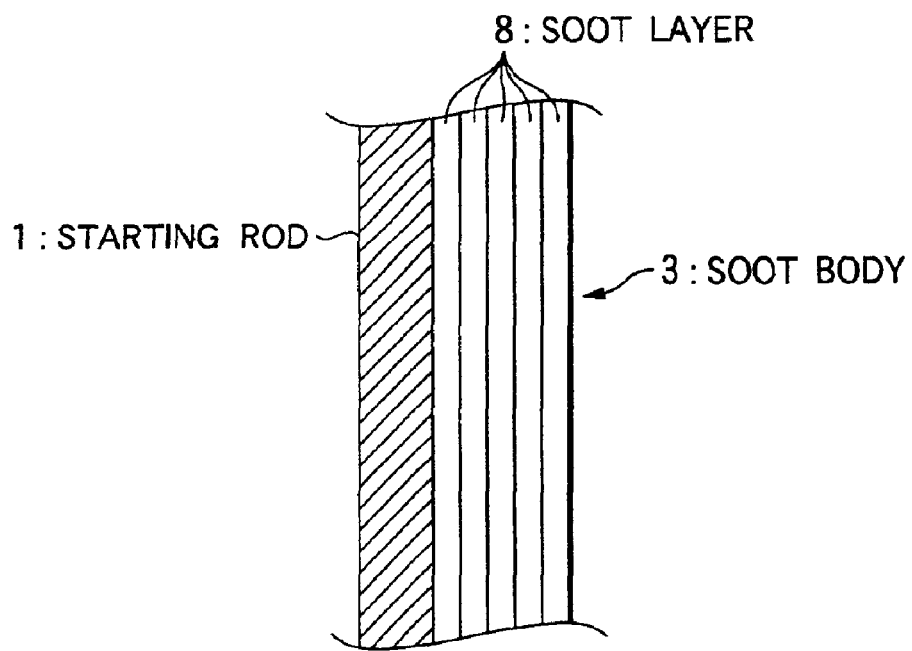
FIG. 3 is an illustration showing the structure of a soot body according to multi-layer soot deposition.
Figure 4:
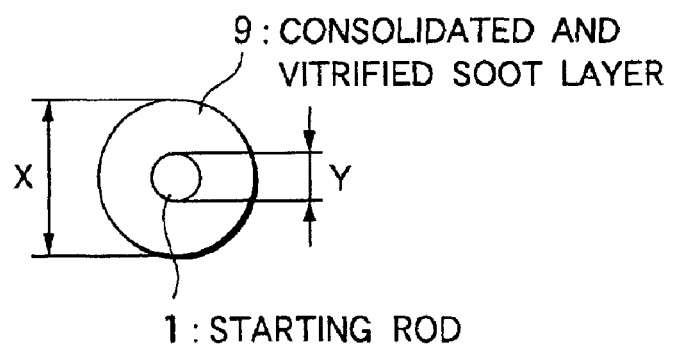
FIG. 4 is an illustration for explaining the definition of the J ratio.

The soot body 3 obtained in this manner, as shown in FIG. 3, has such a structure that the soot is deposited to form a soot layer 8 on the outer periphery of the starting rod 1. Herein, the J ratio is a ratio of the diameter of the starting rod to the diameter of consolidated and vitrified body obtained from a soot body in which the glass layer newly deposited by the soot deposition. The J ratio is defined by X/Y in FIG. 4. Y is the diameter of the starting rod portion, and X is the diameter of the preform which is obtained by consolidating and vitrifying the soot body formed by the soot deposition (jacketing) process. An actual J ratio is calculated on the basis of the measurement of the consolidated and vitrified body. Since the change rate of a diameter of the soot body to a diameter of the consolidated and vitrified body is previously known, a ratio of the diameter of the starting rod in the soot body to the diameter of the soot body (which called J ratio of soot body) is synonymous with J ratio of the preform.

The method of the present invention is to provide the soot deposition method to conduct the accurate J ratio adjustment, and finding of solution of the newly generated problems therein. The method of present invention provides a setting method of the soot deposition completion time including: selecting the main factors which influence the J ratio adjustment; determining their correlations; and making a premise of the correlations.

The new problems generated when the J ratio adjustment is considered, and the means for solving the problems, and the effects will be described below.

In the case where a plurality of soot deposition burners are used, the J ratio fluctuation in the longitudinal direction can be improved in such a manner that the turning back position of the rod or burner is moved, and the soot deposition is completed in the integer times of the averaged number of turns. However, ordinarily, the soot deposition is completed when the J ratio of soot body becomes the target J ratio of soot body, in other words, ordinarily, the soot deposition is completed on the way of the averaged number of turns, and thereby J ratio fluctuation is generated in the longitudinal direction. Accordingly, the present inventors had an idea that the soot deposition amount per averaged number of turns is reduced whereby fine adjustment can be conducted. In order to attain that, it is effective that the raw material ($SiCl_4$) to be supplied to the burner is decreased, or the reciprocating speed is increased. However, decrease of the supply amount of the raw material lowers the deposition efficiency. Therefore, a method to increase the reciprocating speed was considered.

When the reciprocating speed is increased, because the soot deposition time per one traverse is decreased, the J ratio adjustment becomes improved to some extent. However, when the reciprocating speed is further increased, it was found that the outer diameter fluctuation is generated. That is, in the soot deposition process, while the burner or the rod is traversed, the soot deposition is conducted on the rotating starting rod. That is, the soot is deposited on the rod in such a manner that the spiral pattern is written. When the reciprocating speed is low (60–200 mm/minute), the interval of the gap in which the soot of the spiral pattern is not deposited is very narrow, and the outer diameter fluctuation is not generated. However, when the reciprocating speed is increased, the interval of the gap becomes very large, thereby the outer diameter fluctuation (the J ratio fluctuation in the longitudinal direction) is generated when the soot is deposited spirally.

In order to reduce this J ratio fluctuation in the longitudinal direction, it is effective that, as the reciprocating speed increases, the rotating speed is increased. When the rod rotating speed is increased, the soot height which is spirally deposited is averaged, and the outer diameter fluctuation is reduced. However, when the rotating speed is. increased, the centrifugal force on the rod is increased, and thereby there is a limit for increasing the rotating speed.

Further, when the cost of the equipment is considered, it is desirable to use a large size soot deposition burner whose soot deposition efficiency is high, and to decrease the number of burners (the necessary equipment for the raw material system is increased as the increase of the number of burners). As the burner size is increased, the spread of the flame becomes large. Therefore, it is necessary that the burner interval is increased so that the flames of the burners do not interfere with each other and that the deposition efficiency is not lowered. However, as the burner interval is increased, the averaged number of turns is increased. That is not in a desirable direction for the J ratio adjustment. In one method to solve this problem, there is a method to decrease the averaged number of turns by increasing the movement amount of the turning back position. However, this method is not desirable because it causes that the effect of dispersing turning back points in the longitudinal direction for suppressing the J ratio fluctuation is decreased. Another method is that the reciprocating speed is increased to high speed, and the soot deposition amount per traverse is reduced. Even-when the reciprocating speed is increased and the deposition amount of the soot is reduced, the deposition efficiency per time is not lowered.

As described above, in order to obtain the high deposition efficiency, accurate J ratio adjustment and the decrease of the J ratio fluctuation in the longitudinal direction, the reciprocating speed, the axis rotating speed and burner interval respectively have a relationship of trade off. When these parameters are not optimized, even when the J ratio adjustment can be conducted, the J ratio fluctuation in the longitudinal direction becomes too large as the optical fiber preform, or even when the preform in which the J ratio fluctuation in the longitudinal direction is small is obtained, the gap from the target J ratio is too large to guarantee the fiber characteristic. The present invention provides a soot deposition method by which the parameters are optimized, the J ratio fluctuation in the longitudinal direction is small, and the J ratio adjustment can be conducted.

In the present invention, the reciprocating speed v (mm/minute), axis rotating speed r (rpm), and burner interval L (mm) are set so that a value A expressed by $A=(r/v) \times L$ is in the range of $40 \geq A \geq 8$, preferably, $30 \geq A \geq 10$. In this connection, when the burner interval L is estimated by tolerance of ±15 %, (that is, when the setting value of the burner interval is $L_0$, $0.85 L_0 \leq L \leq 1.5 L_0$), in the above expression of A, L may be replaced with $L_0$.

In the above expression of A, when v becomes relatively small, or r or L becomes large, the value A exceeds the upper limit. In other words, when the reciprocating speed is low, the value A of the expression is larger than the upper limit because the v becomes small. This shows that the reciprocating speed becomes small and the one reciprocate time becomes long, and then the deposition amount of the soot per one reciprocal movement is increased, thereby the J ratio adjustment becomes difficult. The value A exceeds the upper limit also when the burner interval becomes large. In this case, it shows that the burner interval becomes large and the averaged number of turns is increased, thereby the J ratio adjustment becomes difficult. Further, also when the axis rotating speed r is increased, the value A exceeds the upper limit. In this case, it shows that the centrifugal force on the rod is increased, and there is a risk that the rod has a crack, which is not desirable.

In the above expression of A, when v becomes large, or r or L becomes small, the value A is lower than the lower limit. In other words, when the reciprocating speed is large (v becomes large) the value A is lower than the lower limit. This shows that the reciprocating speed becomes large and the spiral distance of the soot deposition is spread, thereby the J ratio in the longitudinal direction becomes difficult to suppress. When the burner interval L becomes small, the averaged number of turns is decreased. This shows that it is better for the characteristic of the optical fiber to decrease the reciprocating speed so as to make the spiral distance narrow and so as to increase the J ratio suppression capability in the longitudinal direction. The value A of the above expression is lower than the lower limit also when the axis rotating speed is decreased, This shows that the rotating speed is lowered, and thereby the J ratio fluctuation in the longitudinal direction becomes difficult to reduce.

In the method of the present invention, when basically, in the range of $40 \geq A \geq 8$, preferably, $30 \geq A \geq 10$, v, r, and L are controlled, the J ratio fluctuation suppression in the longitudinal direction and the accurate J ratio adjustment can be conducted. In this connection, in the soot deposition method of the present invention, the soot is spirally deposited. When a center line of the soot which is spirally deposited by one traverse, is close to a center line of the soot deposited at the preceding traverse, there is a tendency that the J ratio fluctuation in the longitudinal direction becomes large Therefore, it is preferable that the relationship between the reciprocating speed v (mm/minute) and the axis rotating speed r is controlled so that the center line of the soot deposited spirally by one traverse is not overlapped with the center line of the soot deposited at the preceding traverse. The relationship between the reciprocating speed v-and the-axis rotating speed r in such the case differs due to the burner interval or the traverse distance between the turning back points Herein, the center line is a line on which an apex of a cone made of deposited soot from one burner is moved.

When the rod reciprocating speed is as low as the prior art, the J ratio adjustment becomes difficult. Accordingly, in the present invention, the rod reciprocating speed v is set faster than the prior art. However, when the speed is too much faster, there is a problem that the interval of the soot which is spirally deposited is spread and the unevenness becomes conspicuous. Therefore, it is preferable that the rod reciprocating speed v (mm/minute) is in the range of $500 \leq v \leq 3000$, more preferably $700 \leq v \leq 2000$. Herein, the lower limit value is the minimum rod reciprocating speed necessary for conducting the J ratio adjustment. The upper limit value is the speed of the limit by which the J ratio fluctuation in the longitudinal direction can be in the level in which there is no problem for the optical fiber characteristic, by adjusting the rotating speed or burner interval.

When the burner interval is too small, the flame from the burner interferes with each other, and the deposition efficiency is lowered. On the other hand, when the burner interval is too large, the averaged number of turns is increased, thereby the J ratio adjustment becomes difficult to conduct. Therefore, in order to conduct the J ratio adjustment, in which the deposition efficiency is good and which is difficult by the referenced technology, it is preferable that the burner interval L (mm) is in the range of $150 \leq L \leq 350$, and more preferably, $200 \leq L \leq 300$. For $L_0$ it is the same.

In order to conduct the accurate J ratio control, it is preferable that the reciprocating speed is increased, and the rotating speed is increased. However, because the increase of the rotating speed results in an increase of the centrifugal force on the rod, the increase of the rotating speed has also the limit. Therefore, when the soot weight of the target J ratio is M (kg) and the outer diameter of the starting rod is b (mm), it is preferable that the axis rotating speed r (rpm) is in the range of $27 \geq 10 \times \mathrm{Log}\,[(M \times r)/b]$.

This expression gives an index in which the durability of the starting rod is increased by increasing the starting rod diameter, or by decreasing the rotating speed when the target soot weight is increased, or an index in which the stress on the starting rod is decreased. Actually, because the target weight M kg and the starting rod diameter b are determined by the target characteristic of the optical fiber, the upper limit is given by the rotating speed of the axis rotation.

As described above, when the reciprocating speed v (mm/minute), axis rotating speed r (rpm), and burner interval L (mm) are controlled, the soot deposition amount per averaged number of turns is reduced. Accordingly, when the number of turns at which the soot weight is closest to the weight of target J ratio and which is the integer times of the averaged number of turns, is made the soot deposition completion turn (at which the soot deposition process is completed), the J ratio adjustment can be conducted with the accuracy which can not be obtained in prior arts.

Further, the more accurate J ratio adjustment can be conducted by a method in which the reciprocating speed v (mm/minute) after B turns is adjusted so that the soot weight deposited during one traverse is (M−N)/C(kg), and the soot deposition is completed when the number of traverse turns is B+C, wherein the soot weight of the target J ratio is M (kg), an integer times of the averaged number of turns at which the soot weight is not more than M (kg) and closest to M (kg) is B turns, the soot weight at B turns is N (kg), and the averaged member of turns is C (times).

EXAMPLE 1

When the burner interval (L) is 150, 200, and 350 mm, and the axis rotating speed (r) and the rod reciprocating speed (v) are changed, the results of numeric values calculated by expression $A=(r/v) \times L$ are shown in Tables 1–3. In Tables 1–3, the axis of ordinate shows axis rotating speed (rpm), and the axis of abscissa shows rod reciprocating speed (mm/minute).

TABLE 1

A = a calculation value of (r/v) × L (burner interval 150 mm)

| | 60 | 100 | 500 | 700 | 900 | 1100 | 1300 | 1500 | 1700 | 1900 | 2100 | 2300 | 2500 | 2700 | 3000 |
|---|---|---|---|---|---|---|---|---|---|---|---|---|---|---|---|
| 30  | 75  | 45  | 9.0  | 6.4  | 5.0  | 4.1  | 3.5  | 3.0  | 2.6  | 2.4  | 2.1  | 2.0  | 1.8  | 1.7  | 1.5 |
| 40  | 100 | 60  | 12.0 | 8.6  | 6.7  | 5.5  | 4.6  | 4.0  | 3.5  | 3.2  | 2.9  | 2.6  | 2.4  | 2.2  | 2.0 |
| 50  | 125 | 75  | 15.0 | 10.7 | 8.3  | 6.6  | 5.8  | 5.0  | 4.4  | 3.9  | 3.6  | 3.3  | 3.0  | 2.8  | 2.5 |
| 60  | 150 | 90  | 18.0 | 12.9 | 10.0 | 8.2  | 6.9  | 6.0  | 5.3  | 4.7  | 4.3  | 3.9  | 3.6  | 3.3  | 3.0 |
| 70  | 175 | 105 | 21.0 | 15.0 | 11.7 | 9.5  | 8.1  | 7.0  | 6.2  | 5.5  | 5.0  | 4.6  | 4.2  | 3.9  | 3.5 |
| 80  | 200 | 120 | 24.0 | 17.1 | 13.3 | 10.9 | 9.2  | 8.0  | 7.1  | 6.3  | 5.7  | 5.2  | 4.8  | 4.4  | 4.0 |
| 90  | 225 | 135 | 27.0 | 19.3 | 15.0 | 12.3 | 10.4 | 9.0  | 7.9  | 7.1  | 6.4  | 5.9  | 5.4  | 5.0  | 4.5 |
| 100 | 250 | 150 | 30.0 | 21.4 | 16.7 | 13.6 | 11.5 | 10.0 | 8.8  | 7.9  | 7.1  | 6.5  | 6.0  | 5.6  | 5.0 |
| 110 | 275 | 165 | 33.0 | 23.6 | 18.3 | 15.0 | 12.7 | 11.0 | 9.7  | 8.7  | 7.9  | 7.2  | 6.6  | 6.1  | 5.5 |
| 120 | 300 | 180 | 36.0 | 25.7 | 20.0 | 16.4 | 13.8 | 12.0 | 10.6 | 9.5  | 8.6  | 7.8  | 7.2  | 6.7  | 6.0 |
| 130 | 325 | 195 | 39.0 | 27.9 | 21.7 | 17.7 | 15.0 | 13.0 | 11.5 | 10.3 | 9.3  | 8.5  | 7.8  | 7.2  | 6.5 |
| 140 | 350 | 210 | 42.0 | 30.0 | 23.3 | 19.1 | 16.2 | 14.0 | 12.4 | 11.1 | 10.0 | 9.1  | 8.4  | 7.8  | 7.0 |
| 150 | 375 | 225 | 45.0 | 32.1 | 25.0 | 20.5 | 17.3 | 15.0 | 13.2 | 11.8 | 10.7 | 9.8  | 9.0  | 8.3  | 7.5 |
| 160 | 400 | 240 | 48.0 | 34.3 | 26.7 | 21.8 | 18.5 | 16.0 | 14.1 | 12.6 | 11.4 | 10.4 | 9.6  | 8.9  | 8.0 |
| 170 | 425 | 255 | 51.0 | 36.4 | 28.3 | 23.2 | 19.6 | 17.0 | 15.0 | 13.4 | 12.1 | 11.1 | 10.2 | 9.4  | 8.5 |
| 180 | 450 | 270 | 54.0 | 38.6 | 30.0 | 24.5 | 20.8 | 18.0 | 15.9 | 14.2 | 12.9 | 11.7 | 10.8 | 10.0 | 9.0 |
| 190 | 475 | 265 | 57.0 | 40.7 | 31.7 | 25.9 | 21.9 | 19.0 | 16.8 | 15.0 | 13.6 | 12.4 | 11.4 | 10.6 | 9.5 |
| 200 | 500 | 300 | 60.0 | 42.9 | 33.3 | 27.3 | 23.1 | 20.0 | 17.6 | 15.8 | 14.3 | 13.0 | 12.0 | 11.1 | 10.0 |

TABLE 2

A = a calculation value of (r/v) × L (burner interval 200 mm)

|  | 60 | 100 | 500 | 700 | 900 | 1100 | 1300 | 1500 | 1700 | 1900 | 2100 | 2300 | 2500 | 2700 | 3000 |
|---|---|---|---|---|---|---|---|---|---|---|---|---|---|---|---|
| 30 | 100 | 60 | 12 | 8.6 | 6.7 | 5.5 | 4.6 | 4.0 | 3.5 | 3.2 | 2.9 | 2.6 | 2.4 | 2.2 | 2.0 |
| 40 | 133 | 80 | 16 | 11.4 | 8.9 | 7.3 | 6.2 | 5.3 | 4.7 | 4.2 | 3.6 | 3.5 | 3.2 | 3.0 | 2.7 |
| 50 | 167 | 100 | 20 | 14.3 | 11.1 | 9.1 | 7.7 | 6.7 | 5.9 | 5.3 | 4.8 | 4.3 | 4.0 | 3.7 | 3.3 |
| 60 | 200 | 120 | 24 | 17.1 | 13.3 | 10.9 | 9.2 | 8.0 | 7.1 | 6.3 | 5.7 | 5.2 | 4.8 | 4.4 | 4.0 |
| 70 | 233 | 140 | 28 | 20.0 | 15.6 | 12.7 | 10.8 | 9.3 | 8.2 | 7.4 | 6.7 | 6.1 | 5.6 | 5.2 | 4.7 |
| 80 | 267 | 160 | 32 | 22.9 | 17.8 | 14.5 | 12.3 | 10.7 | 9.4 | 8.4 | 7.6 | 7.0 | 6.4 | 5.9 | 5.3 |
| 90 | 300 | 180 | 36 | 25.7 | 20.0 | 16.4 | 13.8 | 12.0 | 10.6 | 9.5 | 8.6 | 7.6 | 7.2 | 6.7 | 6.0 |
| 100 | 333 | 200 | 40 | 28.6 | 22.2 | 18.2 | 15.4 | 13.3 | 11.6 | 10.5 | 9.5 | 8.7 | 8.0 | 7.4 | 6.7 |
| 110 | 367 | 220 | 44 | 31.4 | 24.4 | 20.0 | 16.9 | 14.7 | 12.9 | 11.6 | 10.5 | 9.6 | 8.8 | 8.1 | 7.3 |
| 120 | 400 | 240 | 48 | 34.3 | 26.7 | 21.8 | 18.5 | 16.0 | 14.1 | 12.6 | 11.4 | 10.4 | 9.6 | 8.9 | 8.0 |
| 130 | 433 | 260 | 52 | 37.1 | 28.9 | 23.6 | 20.0 | 17.3 | 15.3 | 13.7 | 12.4 | 11.3 | 10.4 | 9.6 | 8.7 |
| 140 | 467 | 280 | 56 | 40.0 | 31.1 | 25.5 | 21.5 | 18.7 | 16.5 | 14.7 | 13.3 | 12.2 | 11.2 | 10.4 | 9.3 |
| 150 | 500 | 300 | 60 | 42.9 | 33.3 | 27.3 | 23.1 | 20.0 | 17.6 | 15.8 | 14.3 | 13.0 | 12.0 | 11.1 | 10.0 |
| 160 | 533 | 320 | 64 | 45.7 | 35.6 | 29.1 | 24.6 | 21.3 | 18.8 | 16.8 | 15.2 | 13.8 | 12.8 | 11.9 | 10.7 |
| 170 | 567 | 340 | 66 | 48.6 | 37.8 | 30.9 | 26.2 | 22.7 | 20.0 | 17.9 | 16.2 | 14.8 | 13.6 | 12.6 | 11.3 |
| 180 | 600 | 360 | 72 | 51.4 | 40.0 | 32.7 | 27.7 | 24.0 | 21.2 | 18.9 | 17.1 | 15.7 | 14.4 | 13.3 | 12.0 |
| 190 | 633 | 380 | 76 | 54.3 | 42.2 | 34.5 | 29.2 | 25.3 | 22.4 | 20.0 | 18.1 | 16.5 | 15.2 | 14.1 | 12.7 |
| 200 | 667 | 400 | 80 | 57.1 | 44.4 | 36.4 | 30.8 | 26.7 | 23.5 | 21.1 | 19.0 | 17.4 | 16.0 | 14.8 | 13.3 |

TABLE 3

A = a calculation value of (r/v) × L (burner interval 350 mm)

|  | 60 | 100 | 500 | 700 | 900 | 1100 | 1300 | 1500 | 1700 | 1900 | 2100 | 2300 | 2500 | 2700 | 3000 |
|---|---|---|---|---|---|---|---|---|---|---|---|---|---|---|---|
| 30 | 175 | 105 | 21 | 15 | 11.7 | 9.5 | 8.1 | 7.0 | 6.2 | 5.5 | 5.0 | 4.6 | 4.2 | 3.9 | 3.5 |
| 40 | 233 | 140 | 28 | 20 | 15.6 | 12.7 | 10.8 | 9.3 | 8.2 | 7.4 | 6.7 | 6.1 | 5.6 | 5.2 | 4.7 |
| 50 | 292 | 175 | 35 | 25 | 19.4 | 15.9 | 13.5 | 11.7 | 10.3 | 9.2 | 8.3 | 7.6 | 7.0 | 6.5 | 5.8 |
| 60 | 350 | 210 | 42 | 30 | 23.3 | 19.1 | 16.2 | 14.0 | 12.4 | 11.1 | 10.0 | 9.1 | 8.4 | 7.6 | 7.0 |
| 70 | 408 | 245 | 49 | 35 | 27.2 | 22.3 | 18.8 | 16.3 | 14.4 | 12.9 | 11.7 | 10.7 | 9.8 | 9.1 | 8.2 |
| 80 | 467 | 280 | 56 | 40 | 31.1 | 25.5 | 21.5 | 18.7 | 16.5 | 14.7 | 13.3 | 12.2 | 11.2 | 10.4 | 8.3 |
| 90 | 525 | 315 | 63 | 45 | 35.0 | 28.6 | 24.2 | 21.0 | 18.5 | 16.6 | 15.0 | 13.7 | 12.6 | 11.7 | 10.5 |
| 100 | 583 | 350 | 70 | 50 | 38.9 | 31.8 | 26.9 | 23.3 | 20.6 | 18.4 | 16.7 | 15.2 | 14.0 | 13.0 | 11.7 |
| 110 | 642 | 385 | 77 | 55 | 42.8 | 35.0 | 29.6 | 25.7 | 22.6 | 20.3 | 18.3 | 16.7 | 15.4 | 14.3 | 12.8 |
| 120 | 700 | 420 | 84 | 60 | 46.7 | 36.2 | 32.3 | 26.0 | 24.7 | 22.1 | 20.0 | 18.3 | 16.6 | 15.6 | 14.0 |
| 130 | 758 | 455 | 91 | 65 | 50.6 | 41.4 | 35.0 | 30.3 | 26.8 | 23.9 | 21.7 | 19.8 | 18.2 | 16.9 | 15.2 |
| 140 | 817 | 490 | 98 | 70 | 54.4 | 44.5 | 37.7 | 32.7 | 28.8 | 25.8 | 23.3 | 21.3 | 19.6 | 18.1 | 16.3 |
| 150 | 875 | 525 | 105 | 75 | 58.3 | 47.7 | 40.4 | 35.0 | 30.9 | 27.6 | 25.0 | 22.8 | 21.0 | 19.4 | 17.5 |
| 160 | 933 | 560 | 112 | 80 | 62.2 | 50.9 | 43.1 | 37.3 | 32.9 | 29.5 | 26.7 | 24.3 | 22.4 | 20.7 | 18.7 |
| 170 | 992 | 595 | 119 | 85 | 66.1 | 54.1 | 45.8 | 39.7 | 35.0 | 31.3 | 28.3 | 25.9 | 23.8 | 22.0 | 19.8 |
| 180 | 1050 | 630 | 126 | 90 | 70.0 | 57.3 | 48.5 | 42.0 | 37.1 | 33.2 | 30.0 | 27.4 | 25.2 | 23.3 | 21.0 |
| 190 | 1108 | 665 | 133 | 95 | 73.9 | 60.5 | 51.2 | 44.3 | 39.1 | 35.0 | 31.7 | 28.9 | 26.6 | 24.6 | 22.2 |
| 200 | 1167 | 700 | 140 | 100 | 77.8 | 63.6 | 53.8 | 46.7 | 41.2 | 36.8 | 33.3 | 30.4 | 28.0 | 25.9 | 23.3 |

An Apparatus in which 4 burners are arranged respectively with the interval of 150, 200, and 350 mm in the structure in FIG. 1, is used. The soot deposition in the multi-layers is conducted on the outer periphery of the starting rod with the outer diameter of 36 mm, and the effective portion length of 500 mm. The production test of the soot body of the outer diameter of 210 mm (the target J ratio is 3.0 times, the soot weight at the time is 15.5 kg) is carried out. The traverse method has a movement in which, after the rod is lowered by the burner interval, it is pulled up by the burner interval×0.9; this operation is conducted 10 times until the rod is dislocated downward by the burner interval; after it is pulled up by the length of the burner interval×1.1, it is lowered by the burner interval; and this operation is conducted repeatedly so that the rod is returned to the initial rod position (the number of turns up to this time is the averaged number of turns, and in this case, 20 times) The soot body is produced by changing the reciprocating speed and the rotating speed of the starting rod (axis rotating speed). The change of the J ratio rate (the rate of the difference of the obtained J ratio and the target J ratio to the target J ratio), is investigated. The soot deposition is completed at the time point at which the soot weight is closest to the weight of the target J ratio at the number of turns which is the integer times of the averaged number of turns. After that, the deaeration may be conducted in the furnace which is maintained at the high temperature and the vitrification is conducted to obtain the transparent optical fiber preform.

As the result, it is found that, when the value of A is in the range of 8–40, the J ratio rate is not larger than ±7%, which is an aim at which a fine quality preform is obtained. Further, it is found that, when the value of A is in the range of 10–30, the J ratio rate can be suppressed to not larger than ±4%.

In the numeric values in Tables 1–3, portions of the reciprocating speed 60 and 100 mm/minute, and the axis rotating speed not larger than 40 rpm, are the range of the prior art method. In the range in which the value of A exceeds 40, the J ratio adjustment is difficult, and it shows the range of the soot deposition condition in which the meaning of the present invention is lost. The range in which the value of A is lower than 8 shows that, when the J ratio fluctuation in the longitudinal direction is considered, it can not satisfy the characteristic required for the preform, or it is not appropriate for the soot deposition condition because the reciprocating speed is increased more than necessary and the J ratio fluctuation suppression ability is lowered.

When briefly described, it is found that the range in which the value of A exceeds 40 is spread, as the burner interval is increased. This shows that the averaged number of turns is increased as the burner interval is increased, and thereby the J ratio adjustment becomes difficult in the range in which the rod traverse is slow. It is found that as the burner interval is reduced, a portion in which the rod reciprocating speed is high is excluded from the range in which the value of A is lower than 8. This shows that it is useful for the optical fiber preform that the J ratio fluctuation suppression is conducted by lowering the rod reciprocating speed because the averaged number of turns is reduced by the burner interval reduction and thus the so much high rod reciprocating speed is not necessary for the J ratio adjustment. Further, when the trade off (J ratio fluctuation in the longitudinal direction and the J ratio adjustment) of the axis rotation and the rod reciprocating speed is considered, a portion in which A is in the range of 10–30 is a more desirable range.

EXAMPLE 2

Except that the burner interval is 200 mm, under the same apparatus structure, starting rod, target J ratio, and traverse condition as Example 1, the soot deposition is conducted at the rod reciprocating speed of 703 mm/minute and the axis rotating speed of 30 and 50 rpm. Then the gas is taken away from soot and the vitrification is conducted to obtain the transparent optical fiber preform. As the result, the gap of the average J ratio in the longitudinal direction from the target J ratio is 0.2 times at 30 rpm (J ratio rate 6.7%), and 0.1 times at 50 rpm (J ratio rate 3.3). Further, J ratio fluctuation in the longitudinal direction (the rate of the unevenness to the diameter of the soot body) is 3.5% at 30 rpm, and 2% at 50 rpm.

EXAMPLE 3

Except for that the burner interval is 200 mm, under the same apparatus structure, starting rod, target J ratio, and traverse condition as Example 1, the soot deposition is conducted at the rod reciprocating speed of 1503 mm/minute and the axis rotating speed of 90 rpm. After that, the deaeration and vitrification are conducted to obtain the transparent optical fiber preform. Because the reciprocating speed is high, and the soot deposition amount per the averaged number of turns is small, the J ratio adjustment becomes easy. The gap of the average J ratio in the longitudinal direction from the target J ratio in the optical fiber preform is 0.11 times (J ratio rate 3.7%). The J ratio fluctuation in the longitudinal direction is 3% by increasing the reciprocating speed.

EXAMPLE 4

Except that the burner interval is 200 mm, under the same apparatus structure, starting rod, target J ratio, and traverse condition as Example 1, the soot deposition is conducted at the rod reciprocating speed of 800 mm/minute and the axis rotating speed of 40 rpm. After that, the deaeration and vitrification are conducted to obtain the transparent optical fiber preform. In this example, because the center line of the soot spirally deposited by one traverse, is almost overlapped with the center line of the soot deposited at the preceding traverse, thereby the J ratio fluctuation becomes large. The gap of the average J ratio in the longitudinal direction from the target J ratio is 0.17 times (J ratio rate 5.7%), and the J ratio fluctuation in the longitudinal direction is 3.7%.

Cmparative Example 1

Except that the burner interval is 200 mm, under the same apparatus structure, starting rod, target J ratio, and traverse condition as Example 1, the soot deposition is conducted at the rod reciprocating speed of 63 mm/minute, and the axis rotating speed of 30 rpm. After that, the deaeration and vitrification are conducted to obtain the transparent optical fiber preform. Because the reciprocating speed is low, and the soot gap amount per averaged number of turns is large, the J ratio control is difficult. The gap of the average J ratio in the longitudinal direction from the target J ratio, in the optical fiber preform is 0.5 times (J ratio rate 16.7%) and the J ratio fluctuation in the longitudinal direction is 6%.

Comparative Example 2

Except that the rod reciprocating speed is to 1503 mm/minute, the same operation as Example 1 is carried out. In this case, although the reciprocating speed is increased, the rotating speed is remained small, and thereby the spiral outer diameter fluctuation is increased. The gap of the average J ratio in the longitudinal direction in the optical fiber preform after the deaeration and vitrification, from the target J ratio is 0.25 times (J ratio rate 8.3%). The J ratio fluctuation in the longitudinal direction is 10.0%.

EXAMPLE 5

Except that the burner interval is 200 mm, under the same apparatus structure, starting rod, and traverse condition as Example 1, the soot deposition is conducted when the rod reciprocating speed is 803 mm/minute, and the axis rotating speed is 600 rpm, and the target J ratio is 3.8. At the time point at which the number of turns is the number of traverse turn of the integer times of the averaged number of turns (in this example, 20 times), the number of turns at which the soot weight is closest to the soot weight (20. 5 kg) which is the target J ratio, is the number of turns at which the number of traverse turns is 500 times (25 times of the averaged number of turns), and the soot weight at that time is 19.8 kg. After that, in the transparent optical fiber preform obtained by conducting the deaeration and vitrification, the gap of the average J ratio in the longitudinal direction from the target J ratio is 0.12 times (J ratio rate 3.2%). The J ratio fluctuation in the longitudinal direction at this time is 2.5%.

EXAMPLE 6

In the same condition as Example 5, at the number of traverse turns of the integer times of the averaged number of turns (in this example, 20 times), the soot deposition is conducted up to the number of traverse turns at which the soot weight becomes a weight, which is not larger than 20.5 kg (defined as M) which is the soot weight as the target J ratio, and is closest to M. The soot weight at the time is 19.8 kg (defined as N). After that, the reciprocating speed is adjusted to 905 mm/minute, and the axis rotating speed is adjusted to 90 rpm so that the soot weight deposited by one traverse is (M−N)/20=0.035 kg. The soot deposition of 20 turns corresponding to one averaged number of turns is continued, and the soot deposition is completed.

After that, in the transparent optical fiber preform obtained by the deaeration and vitrification, the gap of the averaged J ratio in the longitudinal direction from the target J ratio is 0.04 times (J ratio rate 1.1%). The J ratio fluctuation in the longitudinal direction at the time is 2.4%. The results obtained in Examples 2–6, and the comparative examples 1–2 are collected and shown in Table 4.

TABLE 4

Result of examples and comparative examples

| Example No. Comparative example No. | Target J ratio | Reciprocating speed (v) (mm/minute) | Axis rotating speed (r) (rpm) | A value A = (r/v)*L | gap of J ratio (%) | J ratio rate (%) | J ratio fluctuation in the longitudinal direction (%) | D value |
|---|---|---|---|---|---|---|---|---|
| Example 2 | 3.0 | 703 | 30 | 8.5 | 0.2 | 6.7 | 3.5 | 11.1 |
|  |  |  | 50 | 14.2 | 0.1 | 3.3 | 2.0 | 13.3 |
| Example 3 | 3.0 | 1503 | 90 | 12.0 | 0.11 | 3.7 | 3.0 | 15.9 |
| Example 4 | 3.0 | 803 | 40 | 10.0 | 0.17 | 5.7 | 3.7 | 12.4 |
| Example 5 | 3.8 | 803 | 60 | 14.9 | 0.12 | 3.2 | 2.5 | 15.3 |
| Example 6 | 3.8 | 803 | 60 | 15.0 |  |  |  | 15.3 |
|  |  | 905 | 90 | 19.9 | 0.04 | 1.1 | 2.4 | 17.1 |
| Comparative example 1 | 3.0 | 63 | 30 | 95.2 | 0.5 | 16.7 | 6.0 | 11.1 |
| Comparative example 2 | 3.0 | 1503 | 30 | 4.0 | 0.25 | 8.3 | 10.0 | 11.1 | note)
1) Burner interval (L) = 200 mm
2) Gap of J ratio = measured J ratio − target J ratio
3) J ratio rate = [(gap of J ratio)/(target J ratio)] × 100%
4) D = 10 × Log [(M × r)/b]

EXAMPLE 7

Except that the interval between the upper most burner and the second burner is respectively changed to 190 mm, 180 mm, 170 mm, and 160 mm (that is, the burner interval is respectively changed by 5, 10, 15 and 20%), the soot deposition is conducted under the same condition as Example 3. After the deaeration and vitrification, the change of the J ratio is investigated. As the result, the J ratio fluctuation in the longitudinal direction is respectively 3.2%, 4.5%, 7.2%, and 11.3%. The influence due to the difference of the burner interval of about 10% is moderated by the spread of the burner, and it is found that so much influence in the J ratio fluctuation in the longitudinal direction does not appear. However, when the tolerance is exceeded, because the outer diameter fluctuation is further increased, it is desirable that the fluctuation of the burner interval is within 15%. More preferably, it is within 10%.

EXAMPLE 8

Except that the burner interval is 220 mm, the movement distance of the turning back position for each reciprocal movement is 22 mm, and the total movement distance until the movement direction of the turning back position is reversed, is respectively changed to 176 mm, 198 mm, 220 mm, 242 mm, and 264 mm, the soot deposition is conducted in the same condition as Example 3. In the same manner, except that the burner interval is 230 mm, and the movement distance of the turning back position for each reciprocal movement is 23 mm, and the total movement distance until the movement direction of the turning back position is reversed, is respectively changed to 184 mm, 207 mm, 230 mm, 253 mm, and 276 mm, the soot deposition is conducted in the same condition as Example 3. Further, except that the burner interval is 240 mm, and the movement distance of the turning back position for each reciprocal movement is 24 mm, and the total movement distance until the movement direction of the turning back position is reversed, is respectively changed to 192 mm, 216 mm, 240 mm, 264 mm, and 288 mm, the soot deposition conducted in the same condition as Example 3.

In any case, these examples are examples in which the total movement distance until the movement direction of the turning back position is reversed, is respectively dislocated to −20%, −10%, 0%, +10%, and +20% to the burner interval. The J ratio fluctuation in the longitudinal direction after the deaeration and vitrification is almost the same in the 3 examples, and respectively 12%, 5%, 3%, 4% and 11%. It is found that when the gap of the movement distance until the movement direction of the turning back position is reversed is in the range of about ±15%, it is in a tolerance. Desirably, it is within 10%.

EXAMPLE 9

Except that the movement distance of the turning back position for each reciprocal movement is respectively 22 mm, 23 mm, and 24 mm, the soot deposition is conducted in the same condition as Example 3. This is an example in which the movement distance is respectively dislocated by the 10%, 15%, and 20% as compared to Example 3 in which it is moved by each 20 mm As the result, the J ratio fluctuation in the longitudinal direction after the deaeration and vitrification, is respectively 4.3%, 7.2%, and 11.4%. Because the fluctuation is suddenly increased as the gap amount is increased, it can be seen that the gap of the movement distance of the turning back position for each reciprocal movement is desirably within ±15%. More desirably, it is within 10%.

EXAMPLE 10

In the same condition as the Example 3, a number of times at which the turning back position is moved in the predetermined direction is increased to 11 times and 12 times, and after it is moved longer by 20 mm (10%) and 40 mm (20%) than the burner interval, the movement direction is changed to the reversal direction. As the result, the J ratio fluctuation in the longitudinal direction after the deaeration and vitrification is respectively 4.4%, and 11.1%. Because the fluctuation is suddenly increased as the gap amount is increased, it can be seen that the gap of the movement distance until the movement direction of the turning back position is reversed, is desirably within ±15%, more desirably within 10%.

Figure 5:
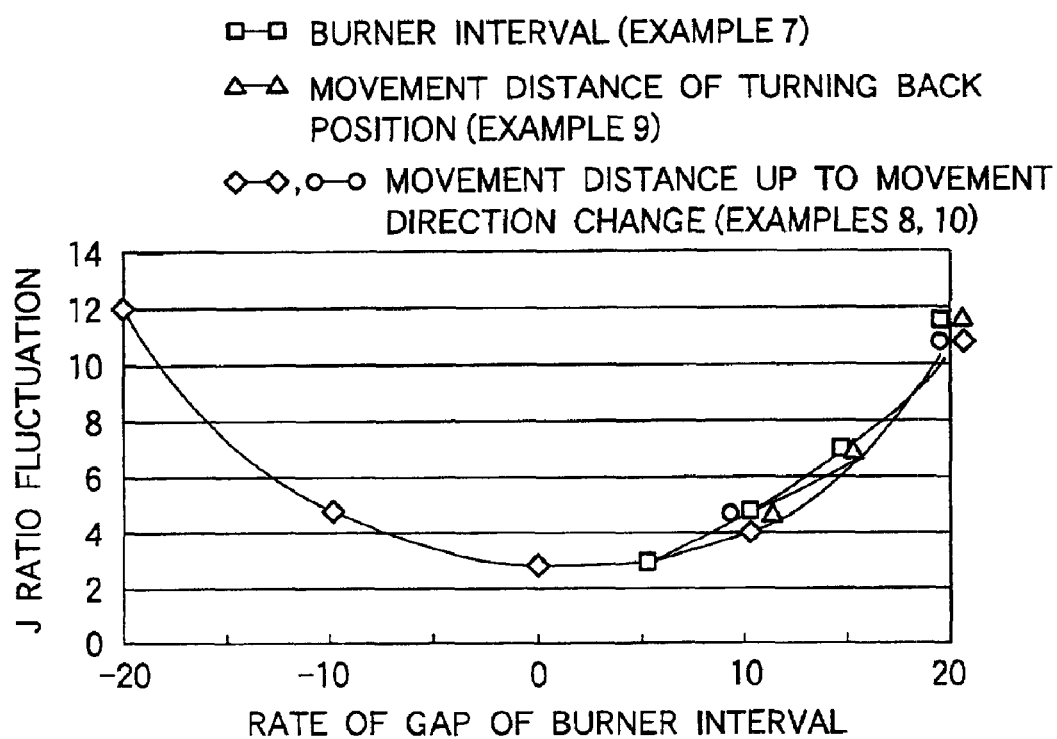
FIG. 5 is a graph showing the result of Examples 7–10.

The results of examples 7–10 are collected and shown in FIG. 5. In FIG. 5, the axis of ordinate shows the J ratio fluctuation. The axis of abscissa shows the rate of the gap from the setting value of the burner interval, the gap from one integer-th of the burner interval (or its setting value) of the movement distance of the turning back position for each reciprocal movement, and the gap from the burner-interval (or its setting value) of the movement distance until the movement direction of the turning back position is reversed. In FIG. 5, □ expresses the gap of the burner interval (Example 7), Δ is the gap of the movement distance of the turning back position for each reciprocal movement (Example 9), ◇ and ○ express the gap of the movement distance until the movement direction of the turning back position is reversed (Examples 8 and 10).

According to the method of the present invention, the reciprocating speed v (mm/minute) axis rotating speed r (rpm), and burner interval L (mm) are set so that a value A expressed by $A=(r/v) \times L$ is in the range of $40 \geq A \geq 8$, the J ratio fluctuation in the longitudinal direction is suppressed, and the J ratio adjustment which can not attain in the prior art, becomes possible.

Further, when the value of A is within the above range, by setting the soot deposition completion time according to the present invention, the more accurate J ratio adjustment can be conducted.

What is claimed is:

1. A method of producing an optical fiber preform comprising:
   preparing a plurality of burners arranged with a predetermined burner interval opposite to a rotating starting rod;
   moving parallely and relatively reciprocally the starting rod and the burners, while a turning back position of the reciprocal movement is moved in a predetermined direction by each one integer-th of the burner interval for each movement, and when the turning back position is moved by the burner interval, the turning back position is moved to a reversal direction by the each one integer-th of the burner interval for each movement, so that glass particles synthesized by the burners are successively deposited on a surface of the starting rod; and
   consolidating and vitrifying the obtained glass particles deposit,
   wherein a relative reciprocating speed of the starting rod and burners v(mm/minute), an axis rotating speed of the starting rod r (rpm), and a burner interval L (mm) are set so that a value A expressed by the expression $A=(r/v) \times L$ is in a range $40 \geq A \geq 8$.

2. The method of producing an optical fiber preform according to claim 2, wherein the relationship between the relative reciprocating speed v (mm/minute) and the axis rotating speed r is controlled so that a center line of the glass particles spirally deposited at one traverse is not overlapped with a center line of the glass particles deposited at the preceding traverse.

3. The method of producing an optical fiber preform according to claim 1, wherein the relative reciprocating speed v (mm/minute) is in the range of $500 \leq v \leq 3000$.

4. The method of producing an optical fiber preform according to claim 1, wherein the burner interval L (mm) is in the range of $150 \text{ mm} \leq L \leq 350 \text{ mm}$.

5. The method of producing an optical fiber preform according to claim 1, wherein the axis rotating speed r (rpm) is in the range of $27 \geq 10 \times \text{Log}[(M \times r)/b]$, wherein M (kg) is a glass particle weight of a target ratio of a diameter of the starting rod portion of the optical fiber preform to a diameter of the optical fiber preform, and an outer diameter of the starting rod is b (mm).

6. The method of producing an optical fiber preform according to claim 1, wherein the glass particles deposition is stopped at the time when the number of turns reaches an integer times of the averaged number of turns at which a glass particle weight becomes the closest for a weight of a target ratio of a diameter of the starting rod portion of the optical fiber preform to a diameter of the optical fiber preform.

7. The method of producing an optical fiber preform according to claim 1, wherein the relative reciprocating speed v (mm/minute) after B turns is adjusted so that a glass particle weight deposited during one traverse is (M−N)/C (kg), and when the number of turns is B+C, deposition of the glass particles is stopped, wherein a glass particle weight of a target ratio of a diameter of a starting rod portion of the optical fiber perform to a diameter of the optical fiber preform is M (kg), and an integer times of the averaged number of turns at which a glass particle weight is not larger than M (kg) and closest to M (kg) is B turns, the glass particle weight at the B turns is N (kg), and the averaged number of turns is C times.

8. The method of producing an optical fiber perform according to claim 1, wherein the parameters are set so that the value A is in a range $30 \geq A \geq 10$.

9. A method of producing an optical fiber preform comprising:
   preparing a plurality of burners arranged with a burner interval of $0.85 \, L_0$–$1.15 L_0$ opposite to a rotating starting rod;
   moving parallely and relatively reciprocally the starting rod and the burners while a turning back position of the reciprocal movement is moved in a predetermined direction by a predetermined distance for each movement, and when the turning back position is moved by $0.85 \, L_0$–$1.15 \, L_0$, the turning back position is moved to a reversal direction by the predetermined distance for each movement, so that glass particles synthesized by the burners are successively deposited on a surface of the starting rod; and
   consolidating and vitrifying the obtained glass particles deposit, wherein a relative reciprocating speed of the starting rod and burners v (mm/minute), an axis rotating speed of the starting rod r (rpm), and a burner interval setting value $L_0$ (mm) are set so that a value A expressed by an expression $A=(r/v) \times L_0$ is in the range $40 \geq A \geq 8$; and
   wherein the axis rotating speed r (rpm) is in the range of $27 \geq 10 \times \text{Log}[(M \times r)/b]$, wherein M (kg) is a glass particle weight of a target ratio of a diameter of the starting rod portion of the optical fiber preform to a diameter of the optical fiber perform, and an outer diameter of the starting rod is b (mm).

10. A method of producing an optical fiber preform comprising:
   preparing a plurality of burners arranged with a burner interval of $0.85 \, L_0$–$1.15 \, L_0$ opposite to a rotating starting rod;
   moving parallely and relatively reciprocally the starting rod and the burners while a turning back position of the reciprocal movement is moved in a predetermined direction by a predetermined distance for each movement, and when the turning back position is moved by $0.85 \, L_0$–$1.15 \, L_0$, the turning back position is moved to a reversal direction by the predetermined distance for each movement, so that glass particles synthesized by the burners are successively deposited on a surface of the starting rod; and consolidating and vitrifying the obtained glass particles deposit, wherein a relative reciprocating speed of the starting rod and burners v (mm/minute), an axis rotating speed of the starting rod r (rpm), and a burner interval setting value $L_0$ (mm) are set so that a value A expressed by an expression $A=(r/v) \times L_0$ is in the range $40 \geqq A \geqq 8$; and wherein the glass particles deposition is stopped at the time when the number of turns reaches an integer times of the averaged number of turns at which a glass particle weight becomes the closest for a weight of a target ratio of a diameter of the starting rod portion of the optical fiber preform to a diameter of the optical fiber preform.

11. A method of producing an optical fiber preform comprising:

preparing a plurality of burners arranged with a burner interval of $0.85\ L_0$–$1.15 L_0$ opposite to a rotating starting rod;

moving parallely and relatively reciprocally the starting rod and the burners while a turning back position of the reciprocal movement is moved in a predetermined direction by a predetermined distance for each movement, and when the turning back position is moved by $0.85\ L_0$–$1.15\ L_0$ the turning back position is moved to a reversal direction by the predetermined distance for each movement, so that glass particles synthesized by the burners are successively deposited on a surface of the starting rod; and consolidating and vitrifying the obtained glass particles deposit, wherein a relative reciprocating speed of the starting rod and burners v (mm/minute), an axis rotating speed of the starting rod r (rpm), and a burner interval setting value $L_0$ (mm) are set so that a value A expressed by an expression $A=(r/v) \times L_0$ in the range $40 \geqq A \geqq 8$; and wherein the relative reciprocating speed v (mm/minute) after B turns is adjusted so that a glass particle weight deposited during one traverse is (M−N)/C (kg), and when the number of turns is B+C, deposition of the glass particles is stopped, wherein a glass particle weight of a target ratio of a diameter of a starting rod portion of the optical fiber preform to a diameter of the optical fiber perform is M (kg), and an integer times of the averaged number of turns at which a glass particle weight is not larger than M (kg) and closest to M (kg) is B turns, the glass particle weight at the B turns is N (kg), and the averaged number of turns is C times.

* * * * *